US011549446B1

(12) United States Patent
Drolet et al.

(10) Patent No.: US 11,549,446 B1
(45) Date of Patent: Jan. 10, 2023

(54) METHOD AND APPARATUS FOR MEASURING COMPRESSOR BLEED FLOW

(71) Applicant: Pratt & Whitney Canada Corp., Longueuil (CA)

(72) Inventors: Martin Drolet, Saint-Amable (CA); Philippe Beauchesne-Martel, Brossard (CA); Kevin Ng, Ancaster (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/665,184

(22) Filed: Feb. 4, 2022

(51) Int. Cl.
*F02C 6/08* (2006.01)
*F02C 9/28* (2006.01)
*F01D 21/00* (2006.01)

(52) U.S. Cl.
CPC .............. *F02C 9/28* (2013.01); *F01D 21/003* (2013.01); *F02C 6/08* (2013.01); *F05D 2220/323* (2013.01); *F05D 2270/3062* (2013.01); *F05D 2270/312* (2013.01); *F05D 2270/313* (2013.01)

(58) Field of Classification Search
CPC ...... F02C 9/18; F02C 6/08; F02C 6/03; F02C 9/28; F04B 2205/04; F04B 2205/03; F05D 2270/301; F05D 2270/312; F05D 2270/313; F05D 2270/3062; G01F 9/00; G01M 15/14
See application file for complete search history.

(56) References Cited

U.S. PATENT DOCUMENTS

| | | | |
|---|---|---|---|
| 5,155,991 A | 10/1992 | Bruun | |
| 9,310,276 B2 | 4/2016 | Gaully | |
| 10,408,217 B2 * | 9/2019 | Moeckel | F04D 27/023 |
| 10,571,316 B2 * | 2/2020 | Gaully | F02C 6/08 |
| 11,047,306 B1 * | 6/2021 | Millhaem | F01D 25/24 |
| 11,078,841 B2 * | 8/2021 | Mackin | F02C 6/08 |
| 11,371,373 B2 * | 6/2022 | Sonokawa | F02C 7/06 |
| 2018/0334962 A1 | 11/2018 | Ortiz | |
| 2021/0246832 A1 * | 8/2021 | Tu | F01D 25/26 |

* cited by examiner

*Primary Examiner* — Todd E Manahan
*Assistant Examiner* — Rodolphe Andre Chabreyrie
(74) *Attorney, Agent, or Firm* — Getz Balich LLC

(57) ABSTRACT

A gas turbine engine includes a compressor, an annular casing surrounding the compressor, and a bleed flow adapter mounted to an exterior side of the annular casing. The annular casing includes the exterior side and an interior side. The interior side surrounds a compressor bleed cavity located downstream of at least a portion of the compressor. The bleed flow adapter is in fluid communication with the bleed cavity. The bleed flow adapter includes an inlet end, an outlet end, and an inner diameter surface extending between the inlet end and the outlet end. The inner diameter surface defines a bleed passage. The bleed flow adapter further includes a fluid port formed through the inner diameter surface. The gas turbine engine further includes a bleed flow measurement system including a first pressure sensor in fluid communication with the bleed passage of the bleed flow adapter via the fluid port.

20 Claims, 7 Drawing Sheets

METHOD AND APPARATUS FOR MEASURING COMPRESSOR BLEED FLOW

TECHNICAL FIELD

This disclosure relates generally to instrumentation systems for aircraft gas turbine engines and more particularly to bleed fluid measurement systems and methods for determining bleed fluid flow supplied by a gas turbine engine to external loads.

BACKGROUND OF THE ART

In addition to providing power to an aircraft for propulsion, modern gas turbine engines are often used to provide compressor bleed fluid (e.g., air) to various external loads associated with the aircraft such as cabin air pressure systems, environmental control systems (ECS), and de-icing and/or anti-icing systems for aircraft wings and/or nacelles. Extracting compressor bleed fluid is detrimental to the engine thermodynamic cycle of the gas turbine engine because the extracted bleed fluid does not produce work in the downstream turbines. As such, bleed fluid extraction may generally be accounted for when defining aircraft power settings and when performing engine power assurance checks. For example, gas turbine engines may conventionally be operated using pre-defined sets of assumptions regarding the amount of bleed fluid used by the aircraft external loads, and the impact of the bleed fluid extraction on the associated gas turbine engine. Conservative margins regarding bleed fluid extraction have been applied in the operation of gas turbine engines in order to guarantee engine safety, but these conservative margins have also limited engine performance and operational capabilities. Accordingly, improved systems and methods for providing compressor bleed fluid to gas turbine engine external loads are needed.

SUMMARY

It should be understood that any or all of the features or embodiments described herein can be used or combined in any combination with each and every other feature or embodiment described herein unless expressly noted otherwise.

According to an aspect of the present disclosure, a gas turbine engine includes a compressor, an annular casing surrounding the compressor, and a bleed flow adapter mounted to an exterior side of the annular casing. The compressor is rotatable about a longitudinal centerline of the gas turbine engine. The compressor configured to drive a core fluid flow along a core flow path of the gas turbine engine. The annular casing includes the exterior side and an interior side. The interior side surrounds a compressor bleed cavity located downstream of at least a portion of the compressor. The bleed flow adapter is in fluid communication with the bleed cavity. The bleed flow adapter includes an inlet end, an outlet end, and an inner diameter surface extending between the inlet end and the outlet end. The inner diameter surface defines a bleed passage extending from the inlet end to the outlet end. The bleed flow adapter further includes a fluid port formed through the inner diameter surface. The gas turbine engine further includes a bleed flow measurement system including a first pressure sensor in fluid communication with the bleed passage of the bleed flow adapter via the fluid port.

In any of the aspects or embodiments described above and herein, the bleed flow measurement system may further include a second pressure sensor and a temperature sensor.

In any of the aspects or embodiments described above and herein, the second pressure sensor and the temperature sensor may be mounted to the annular casing. The second pressure sensor and the temperature sensor may be in fluid communication with the compressor bleed cavity.

In any of the aspects or embodiments described above and herein, the bleed flow adapter may be mounted to the annular casing at a first circumferential location and the second pressure sensor and the temperature sensor are mounted to the annular casing at a second circumferential location which is different than the first circumferential location.

In any of the aspects or embodiments described above and herein, the second circumferential location may be circumferentially spaced from the first circumferential location by at least ninety degrees with respect to the longitudinal centerline.

In any of the aspects or embodiments described above and herein, the second pressure sensor and the temperature sensor may be positioned downstream of the outlet end of the bleed flow adapter.

In any of the aspects or embodiments described above and herein, the bleed flow measurement system may further include a controller in signal communication with the first pressure sensor, the second pressure sensor, and the temperature sensor. The controller may be configured to determine a bleed mass flow rate of bleed fluid flowing through the bleed flow adapter based on a first pressure signal from the first pressure sensor, a second pressure signal from the second pressure sensor, and a temperature signal from the temperature sensor.

In any of the aspects or embodiments described above and herein, the controller may be configured to determine a percentage value of the bleed mass flow rate with respect to a core mass flow rate of the core fluid flow along a core flow path of the gas turbine engine.

In any of the aspects or embodiments described above and herein, the gas turbine engine may further include a combustor configured to receive the core fluid flow from the compressor along the core flow path. The controller may be configured to control a fuel flow rate to the combustor based on the bleed mass flow rate as the percentage value.

In any of the aspects or embodiments described above and herein, the bleed flow adapter may include a seal seat formed in the inner diameter surface downstream of the fluid port.

According to another aspect of the present disclosure, a gas turbine engine includes a compressor, an annular casing surrounding the compressor, and a bleed flow adapter mounted to an exterior side of the annular casing. The compressor is rotatable about a longitudinal centerline of the gas turbine engine. The compressor configured to drive a core fluid flow along a core flow path of the gas turbine engine. The annular casing includes the exterior side and an interior side. The interior side surrounds a compressor bleed cavity located downstream of at least a portion of the compressor. The bleed flow adapter is in fluid communication with the bleed cavity. The bleed flow adapter includes an inlet end, an outlet end, and an inner diameter surface extending between the inlet end and the outlet end. The inner diameter surface defines a bleed passage extending from the inlet end to the outlet end. The bleed flow adapter further includes a fluid port formed through the inner diameter surface. The gas turbine engine further includes a bleed flow measurement system including a first pressure sensor, a second pressure sensor, a temperature sensor, and a controller in signal communication with the first pressure sensor, the second pressure second, and the temperature sensor. The first pressure sensor is in fluid communication with the bleed passage of the bleed flow adapter via the fluid port. The second pressure sensor is mounted to the annular casing. The second pressure sensor is in fluid communication with the compressor bleed cavity. The temperature sensor is mounted to the annular casing adjacent the second pressure sensor. The temperature sensor is in fluid communication with the compressor bleed cavity. The controller is configured to determine a bleed mass flow rate of bleed fluid flowing through the bleed flow adapter based on a first pressure signal from the first pressure sensor, a second pressure signal from the second pressure sensor, and a temperature signal from the temperature sensor.

In any of the aspects or embodiments described above and herein, the gas turbine engine may further include a combustor configured to receive the core fluid flow from the compressor along the core flow path. The controller may be configured to determine a percentage value of the bleed mass flow rate with respect to a core mass flow rate of the core fluid flow along the core flow path of the gas turbine engine. The controller may be further configured to control a fuel flow rate to the combustor based on the bleed mass flow rate as the percentage value.

According to another aspect of the present disclosure, a method for determining bleed fluid flow supplied by a gas turbine engine includes supplying bleed fluid from a compressor to an external load via a bleed flow adapter, measuring a first pressure of the bleed fluid within the bleed flow adapter, and determining a bleed mass flow rate of the bleed fluid through the bleed flow adapter using the measured pressure.

In any of the aspects or embodiments described above and herein, the method may further include measuring a second pressure and a temperature of the bleed fluid.

In any of the aspects or embodiments described above and herein, the second pressure may be a static pressure and the temperature may be a static temperature. The method may further include approximating a total pressure using the static pressure and approximating a total temperature using the static temperature.

In any of the aspects or embodiments described above and herein, the step of determining the bleed mass flow rate may include determining the bleed mass flow rate of the bleed fluid through the bleed flow adapter using the measured temperature.

In any of the aspects or embodiments described above and herein, the step of measuring the temperature of the bleed fluid may include measuring the temperature of the bleed fluid before the bleed fluid enters the bleed flow adapter.

In any of the aspects or embodiments described above and herein, the step of measuring the temperature of the bleed fluid may include measuring the temperature of the bleed fluid after the bleed fluid enters the bleed flow adapter.

In any of the aspects or embodiments described above and herein, the method may further include determining a core mass flow rate of a core fluid flow along a core flow path of the gas turbine engine and determining a percentage value of the bleed mass flow rate with respect to the core mass flow rate of the core fluid flow.

In any of the aspects or embodiments described above and herein, the method may further include controlling a fuel flow rate to a combustor of the gas turbine engine based on the percentage value.

The present disclosure, and all its aspects, embodiments and advantages associated therewith will become more readily apparent in view of the detailed description provided below, including the accompanying drawings.

DETAILED DESCRIPTION

Figure 1:
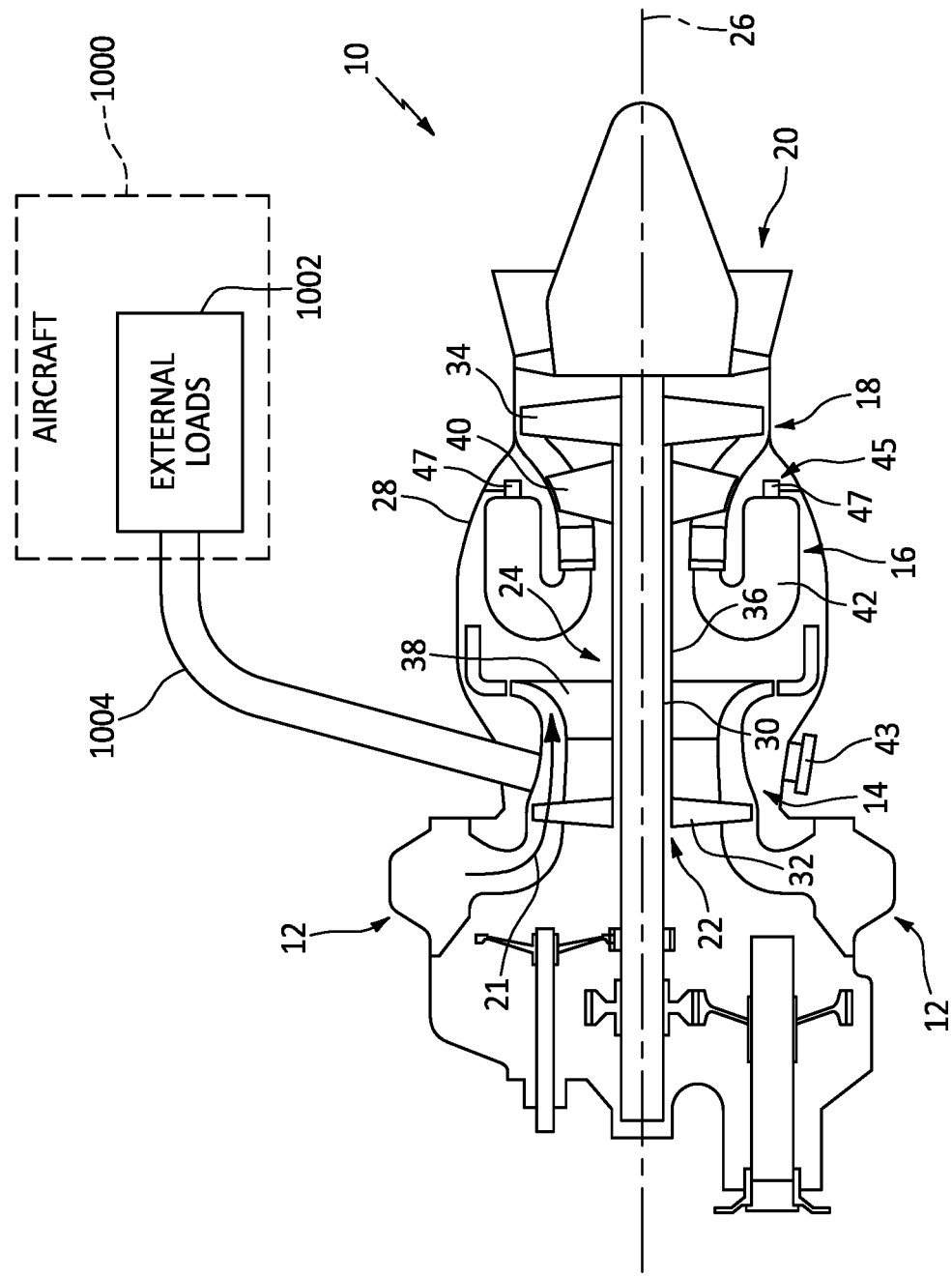
FIG. 1 illustrates a side schematic view of a gas turbine engine, in accordance with one or more embodiments of the present disclosure.

Referring to FIG. 1, an exemplary gas turbine engine 10 is schematically illustrated. The gas turbine engine 10 is disclosed herein as a two-spool turboshaft engine. The gas turbine engine 10 of FIG. 1 includes an inlet 12, a compressor section 14, a combustor section 16, a turbine section 18, and an exhaust section 20. The compressor section 14 drives core fluid (e.g., air) from the inlet 12 along a core flow path 21 for compression and communication into the combustor section 16 and then expansion through the turbine section 18. Although depicted as a turboshaft gas turbine engine in the disclosed non-limiting embodiments, it should be understood that the concepts described herein are not limited to use with turboshafts as the teachings may be applied to other types of gas turbine engines (e.g., turbofan engines, turboprop engines, auxiliary power units (APUs), etc.) including those with single-spool or three-spool architectures.

The gas turbine engine 10 of FIG. 1 includes a low-pressure spool 22 and a high-pressure spool 24 mounted for rotation about a longitudinal centerline 26 (e.g., a rotational axis) of the gas turbine engine 10 relative to an engine static structure 28 (e.g., an engine case). The low-pressure spool 22 includes a low-pressure shaft 30 that interconnects a low-pressure compressor 32, and a low-pressure turbine 34. The low-pressure shaft 30 may drive one or more power shafts, for example, through one or more respective gear reduction systems. The high-pressure spool 24 includes a high-pressure shaft 36 that interconnects a high-pressure compressor 38 and a high-pressure turbine 40. It is to be understood that "low pressure" and "high pressure" or variations thereof as used herein are relative terms indicating that the high pressure is greater than the low pressure. An annular combustor 42 is disposed between the high-pressure compressor 38 and the high-pressure turbine 40 along the longitudinal centerline 26. The low-pressure shaft 30 and the high-pressure shaft 36 are concentric and rotate about the longitudinal centerline 26.

The combustor 42 of FIG. 1 is a reverse flow annular combustor. The combustor section 16 includes a fuel injection system 45 including a plurality of circumferentially distributed fuel nozzles 47 configured to deliver a fuel-air mixture to the combustor 42. The fuel injection system 45 is configured to control a fuel flow rate of fuel provided to the combustor 42. Fluid flow along the core flow path 21 is compressed by the low-pressure compressor 32, then the high-pressure compressor 38, mixed and burned with the fuel in the combustor 42, and then expanded over the high-pressure turbine 40 and the low-pressure turbine 34. The low-pressure turbine 34 and the high-pressure turbine 40 rotationally drive the low-pressure spool 22 and the high-pressure spool 24, respectively, in response to the expansion.

The gas turbine engine 10 of FIG. 1 includes compressor bleed systems which may be used for the extraction of compressor bleed fluid (e.g., bleed air) from one or more stages of the low-pressure compressor 32 and/or the high-pressure compressor 38 of the compressor section 14. An aircraft 1000, for which the gas turbine engine 10 is configured to provide power for propulsion, may include one or more external loads 1002 which require pressurized fluid for operation. As used herein, the term "external loads" is used to refer to pressurized fluid loads physically outside of the gas turbine engine 10. Examples of external loads include, but are not limited to, aircraft systems such as cabin air pressure systems, environmental control systems (ECS), and de-icing and/or anti-icing systems for aircraft wings and/or nacelles. Bleed fluid from the compressor section 14 may be used by the one or more external loads 1002 during operation of the aircraft 1000. Bleed fluid for external loads may be provided from various portions of the compressor section 14 depending, for example, on the pressure and volume of bleed fluid that is necessary for the particular external load. For example, bleed fluid for external loads may be provided from one or more bleed cavities of the compressor section 14 located downstream of at least a portion of the low-pressure compressor 32 and/or the high-pressure compressor 38. The terms "upstream" and "downstream," as used herein, refer to positions relative to the expected direction of bleed fluid flow supplied to the external loads (e.g., the external loads 1002). To provide an example, the gas turbine engine 10 of FIG. 1 includes a bleed transfer tube 1004 extending from a radially inner bleed fluid cavity of the compressor section 14 to one or more external loads 1002 of the aircraft 1000. For further example, the gas turbine engine 10 of FIG. 1 includes a mating flange 43 in fluid communication with a radially outer bleed fluid cavity of the compressor section 14. The mating flange 43 may be directly fluidly coupled to one or more external loads of the aircraft 1000, such as the external loads 1002, or may be indirectly fluidly coupled to the external loads via one or more bleed fluid conduits.

Figure 2:
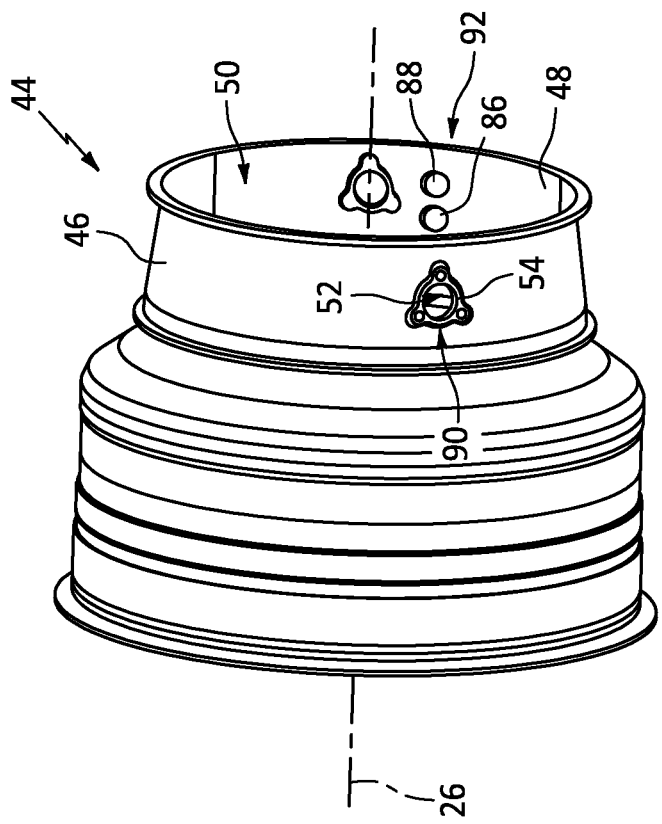
FIG. 2 illustrates perspective view of an annular casing for a compressor, in accordance with one or more embodiments of the present disclosure.

Referring to FIG. 2, a perspective view of an annular casing 44 for the compressor section 14 is illustrated. The annular casing 44 is disposed about the longitudinal centerline 26 and may surround all or a portion of the low-pressure compressor 32 and/or the high-pressure compressor 38 of the compressor section 14 of the gas turbine engine 10. The annular casing 44 includes an exterior side 46 and an interior side 48. The interior side 48 surrounds a compressor bleed cavity 50 located downstream of at least a portion of the low-pressure compressor 32 and/or the high-pressure compressor 38. The annular casing 44 includes at least one opening 52 extending through the annular casing 44 from the interior side 48 to the exterior side 46. The exterior side 46 of the annular casing 44 may include a mating flange 54 or other mounting structure surrounding or otherwise adjacent the opening 52.

Figure 3:
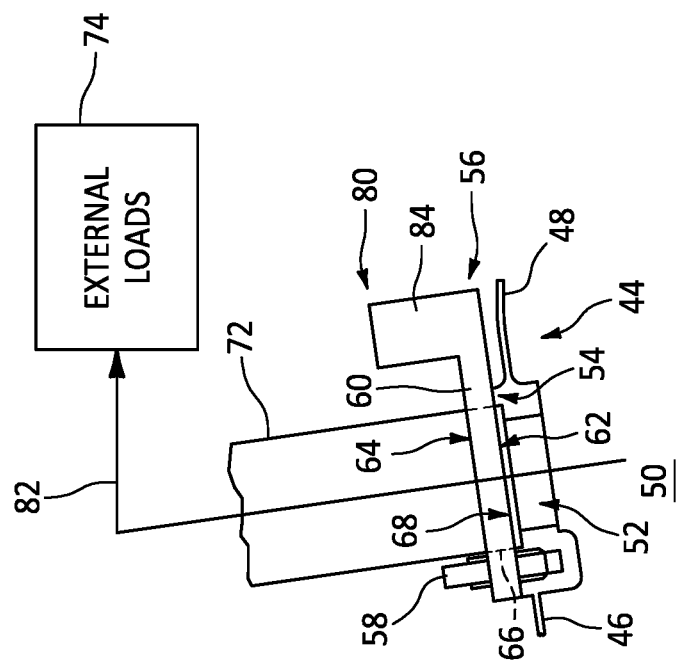
FIG. 3 illustrates a schematic view of a bleed flow adapter for the annular casing of FIG. 2, in accordance with one or more embodiments of the present disclosure.
Figure 4:
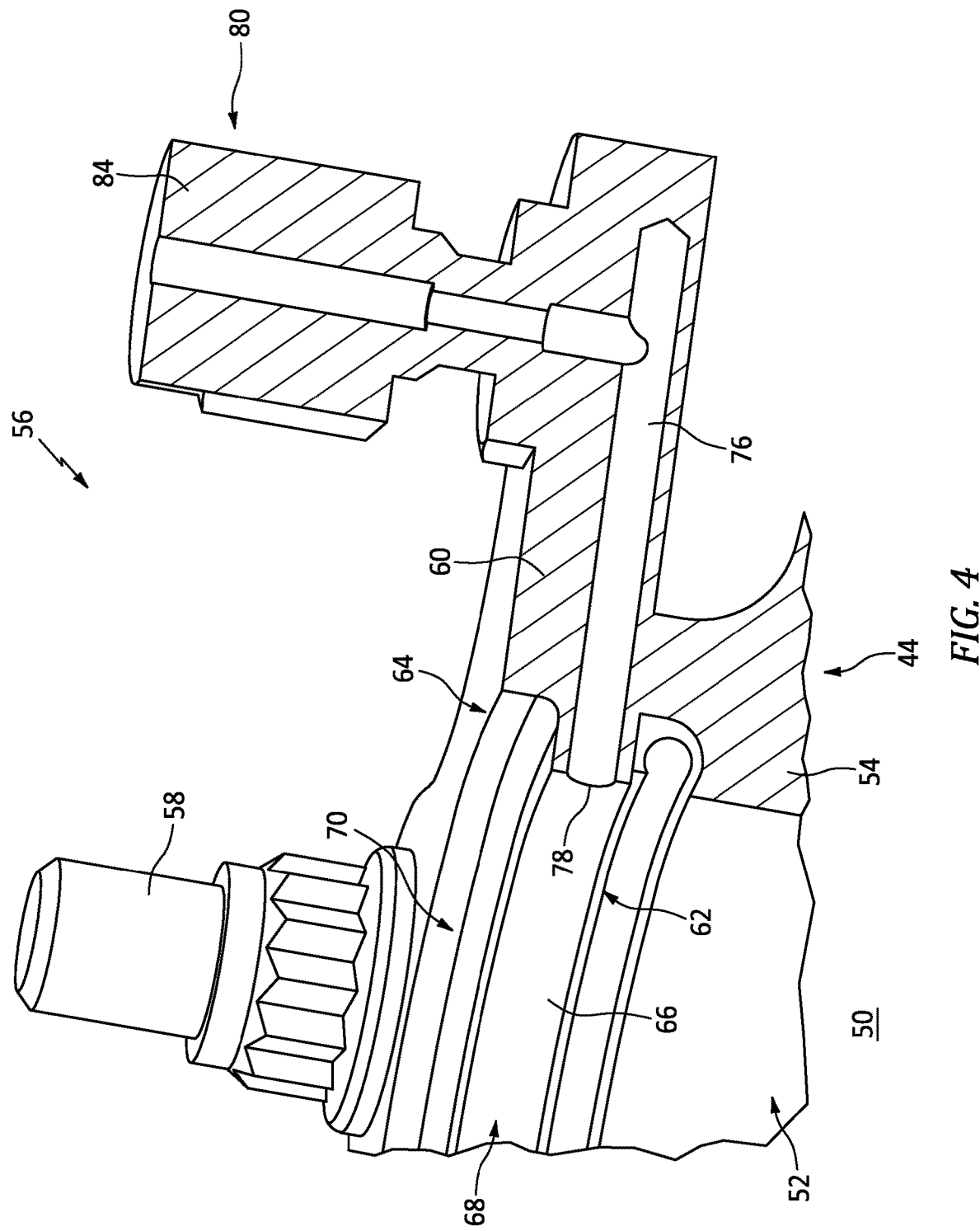
FIG. 4 illustrates a cutaway view of the bleed flow adapter of FIG. 3, in accordance with one or more embodiments of the present disclosure.

Referring to FIGS. 3 and 4, a bleed flow adapter 56 is illustrated. The bleed flow adapter 56 is mounted to the exterior side 46 of the annular casing 44. For example, the bleed flow adapter 56 may be mounted to the mating flange 54 by one or more fasteners 58. The bleed flow adapter 56 includes an adapter body 60 extending between an inlet end 62 and an outlet end 64 opposite the inlet end 62. The adapter body 60 of the bleed flow adapter 56 further includes an inner diameter surface 66 extending from the inlet end 62 to the outlet end 64. The inner diameter surface 66 defines a bleed passage 68 through the adapter body 60 from the inlet end 62 to the outlet end 64.

The bleed flow adapter 56 of FIG. 4 includes a seal seat 70 formed in the inner diameter surface 66 of the adapter body 60. The seal seat 70 includes an annular recess in the inner diameter surface 66 configured to accommodate a seal (not shown) for a bleed transfer tube 72 (see FIG. 3), thereby providing a fluid seal between the bleed flow adapter 56 and the bleed transfer tube 72. The bleed transfer tube 72 may be selectively installed in the bleed flow adapter 56 to fluidly connect the compressor bleed cavity 50 to one or more external loads 74, such as the external loads 1002 of the aircraft 1000 of FIG. 1. It should be understood, however, that the present disclosure is not limited to the particular sealing configuration illustrated in FIG. 4 and that other mating configurations of the bleed flow adapter 56 and the bleed transfer tube 72 may be contemplated consistent with the teachings of the present disclosure.

The bleed flow adapter 56 further includes a fluid port 76 extending through the adapter body 60. The fluid port 76 includes an inlet 78 formed through the inner diameter surface 66 between the inlet end 62 of the adapter body 60 and the seal seat 70.

Referring to FIGS. 2-6, a bleed flow measurement system 80 is configured to measure a mass flow rate of the bleed fluid supplied to the one or more external loads 74 along a bleed fluid flow path 82 via the bleed flow adapter 56. As shown in FIGS. 3 and 4, the bleed flow measurement system 80 includes a pressure sensor 84 in fluid communication with the bleed passage 68 of the bleed flow adapter 56 via the fluid port 76. The pressure sensor 84 is configured as a static pressure sensor to measure a static pressure of the bleed fluid within the bleed flow adapter 56.

The bleed flow measurement system 80 includes a pressure sensor 86 and a temperature sensor 88. The pressure sensor 86 and the temperature sensor 88 are configured to determine a total pressure (Pt) and a total temperature (Tt), respectively, of the bleed fluid which will be supplied to the external loads 74. In general, constituents of total pressure (sometimes referred to as "stagnation pressure") include the static pressure and the dynamic pressure (also known as "velocity pressure") of the measured fluid. Similarly, the total temperature (sometimes referred to as "stagnation temperature") includes the static temperature of the measured fluid and additionally accounts for the fluid flow-based kinetic energy of the measured fluid.

In combination with a discharge coefficient ($C_d$) of the bleed transfer tube 72, the static pressure ($P_s$), total pressure ($P_t$), and total temperature ($T_t$) measured by the pressure sensor 84, pressure sensor 86, and temperature sensor 88, respectively, may be used to determine the mass flow rate of the bleed fluid supplied to the external loads 74 via the bleed flow adapter 56 and bleed transfer tube 72. The discharge coefficient of the bleed transfer tube 72 may be a predetermined value for the particular bleed transfer tube 72 which is known, for example, from numerical simulation, calibration using a fluid flow measurement device such as a venturi tube, or another suitable analytical process. Accordingly, the mass flow rate of the bleed fluid flow supplied to the external loads 74 may be determined, for example, using Equation [1]:

$$W * \frac{\sqrt{T_t}}{P_t} = f\left(C_d, A, \sqrt{\frac{dP}{P_t}}\right) \quad [1]$$

where $W*\sqrt{T}/P_t$ may be approximately constant for values of a ratio of $P_t/P_s$ which are greater than about 1.89, for example, in a choked flow condition of the bleed fluid flow through the bleed transfer tube 72.

Figure 5:
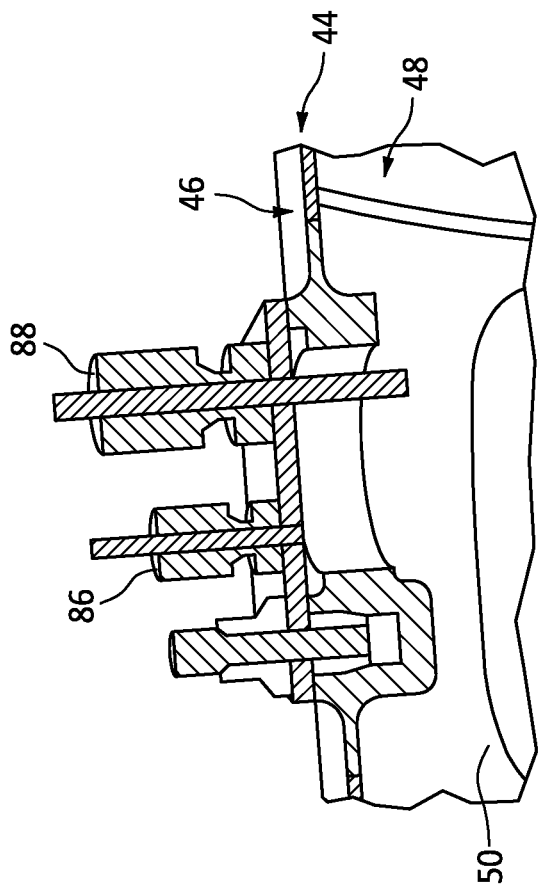
FIG. 5 illustrates a side cross-sectional view of sensors for a bleed flow measurement system, in accordance with one or more embodiments of the present disclosure.

As shown in FIGS. 3 and 5, in some embodiments, the pressure sensor 86 and the temperature sensor 88 may be mounted to the annular casing 44 to measure the respective total pressure and total temperature of the bleed fluid within the compressor bleed cavity 50. Where the compressor bleed cavity 50 is sufficiently large, the Mach number of the bleed fluid within the compressor bleed cavity 50 may be relatively low, such that static pressure and temperature measurements of the bleed fluid may be approximated as total pressure and temperature measurements. Accordingly, in some embodiments, and as shown in FIG. 5, the pressure sensor 86 may be configured as a static pressure sensor, for example, similar to the pressure sensor 84. Similarly, the temperature sensor 88 may be configured as a static temperature sensor. The configuration of the pressure sensor 86 and the temperature sensor 88 of FIG. 5 may provide simpler installation and improved reliability in contrast to the use of conventional total pressure and/or total temperature sensors in the compressor bleed cavity 50.

The pressure sensor 86 and the temperature sensor 88 may be mounted proximate one another, however, the present disclosure is not limited to any particular location of the pressure sensor 86 relative to the temperature sensor 88. As shown in FIG. 3, the pressure sensor 86 and the temperature sensor 88 may be mounted to the annular casing 44 at a second circumferential position 92 which is circumferentially spaced from a first circumferential position 90 of the bleed flow adapter 56, relative to the longitudinal centerline 26. The separation of the pressure sensor 86 and the temperature sensor 88 from the pressure sensor 84, located at the bleed flow adapter 56, prevents or reduces dynamic effects of the bleed fluid flow into the opening 52 and bleed flow adapter 56 from impacting the measurement of the pressure sensor 86 and temperature sensor 88. For example, the first circumferential position 90 may be circumferentially spaced 180 degrees from the second circumferential position 92 or at least ninety degrees from the second circumferential position 92 with respect to the longitudinal centerline 26.

Figure 6:
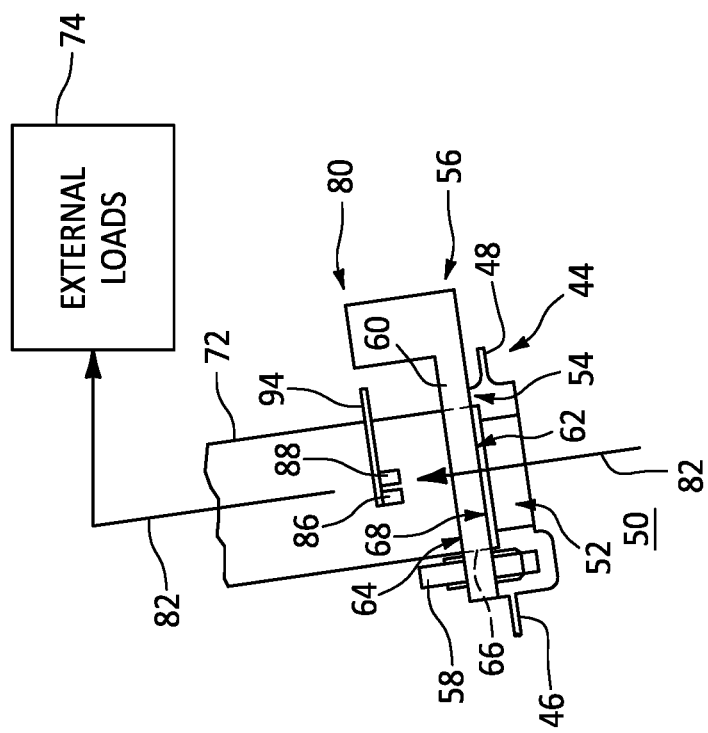
FIG. 6 illustrates a schematic view of a bleed flow adapter for the annular casing of FIG. 2, in accordance with one or more embodiments of the present disclosure.

As shown in FIG. 6, in some embodiments, the pressure sensor 86 and the temperature sensor 88 may alternatively be positioned in the bleed transfer tube 72 to measure the total pressure and total temperature, respectively, of the bleed fluid flowing within the bleed transfer tube 72. The pressure sensor 86 and the temperature sensor 88 of FIG. 6 are configured as Kiel tubes or Pitot tubes, for example, which may be positioned to face the bleed fluid entering the bleed transfer tube 72 along the bleed fluid flow path 82. The pressure sensor 86 and the temperature sensor 88 may be mounted to a rake 94 mounted to and extending through the bleed transfer tube 72. The rake 94 may be oriented to position the pressure sensor 86 and the temperature sensor 88 in a substantially center portion of the bleed transfer tube 72.

Figure 7:
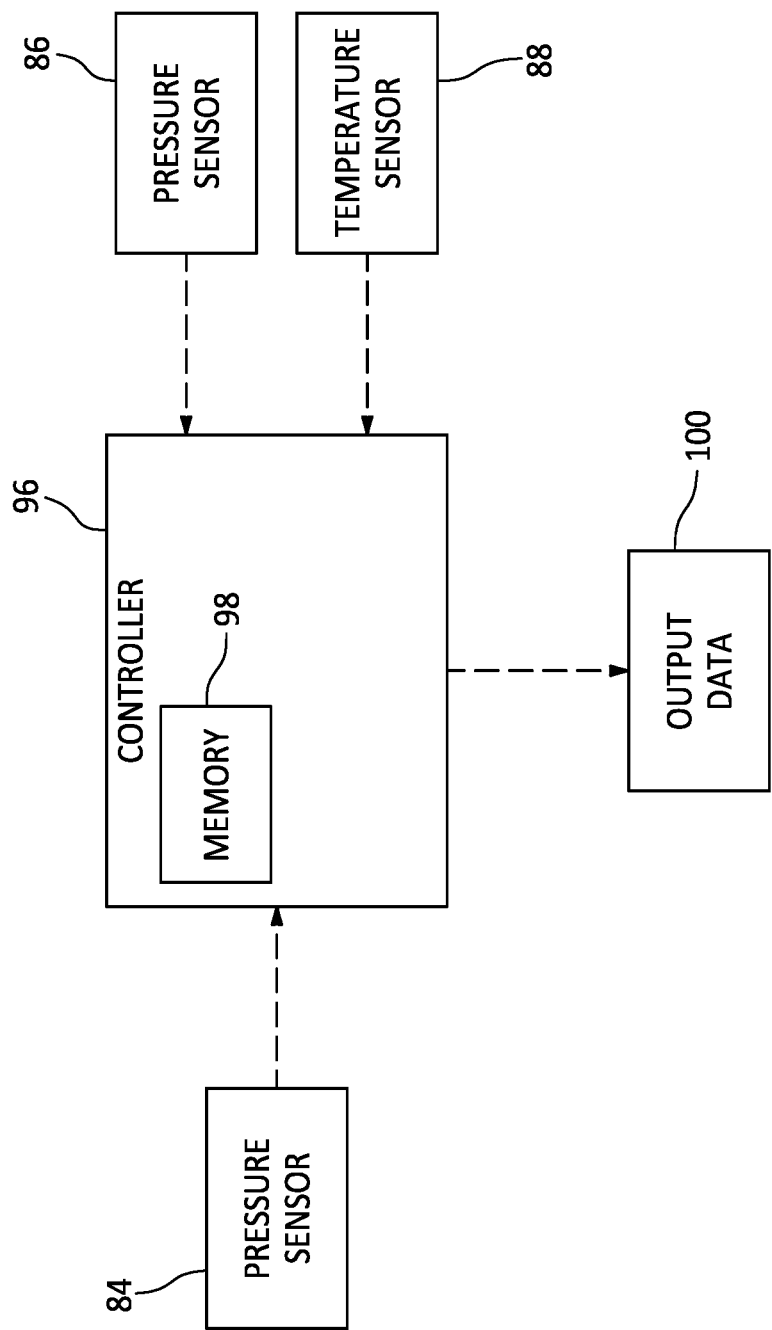
FIG. 7 illustrates a block diagram of a bleed flow measurement system, in accordance with one or more embodiments of the present disclosure.

Referring to FIG. 7, in some embodiments, the bleed flow measurement system 80 may include a controller 96. The controller 96 may be in signal communication with the pressure sensor 84, the pressure sensor 86, and the temperature sensor 88, as well as other components of the gas turbine engine 10. The controller 96 may include any type of computing device, computational circuit, or any type of process or processing circuit capable of executing a series of instructions that are stored in memory 98. The controller 96 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 98 may represent one or more algorithms for controlling the aspects of the gas turbine engine 10, and the stored instructions are not limited to any particular form (e.g., program files, system data, buffers, drivers, utilities, system programs, etc.) provided they can be executed by the controller 96. The memory 98 may be a non-transitory computer readable storage medium configured to store instructions that when executed by one or more processors, cause the one or more processors to perform or cause the performance of certain functions. The memory 98 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 96 may be achieved via the use of hardware, software, firmware, or any combination thereof. The controller 96 may include input devices (e.g., a keyboard, a touch screen, etc.) that enable the operator to input instructions or data. The controller 96 may also include output devices which enable the operator to receive output data 100 from the controller 96 or enable the controller 96 to provide the output data 100 to other systems of the gas turbine engine 10 for operation of said systems.

Figure 8:
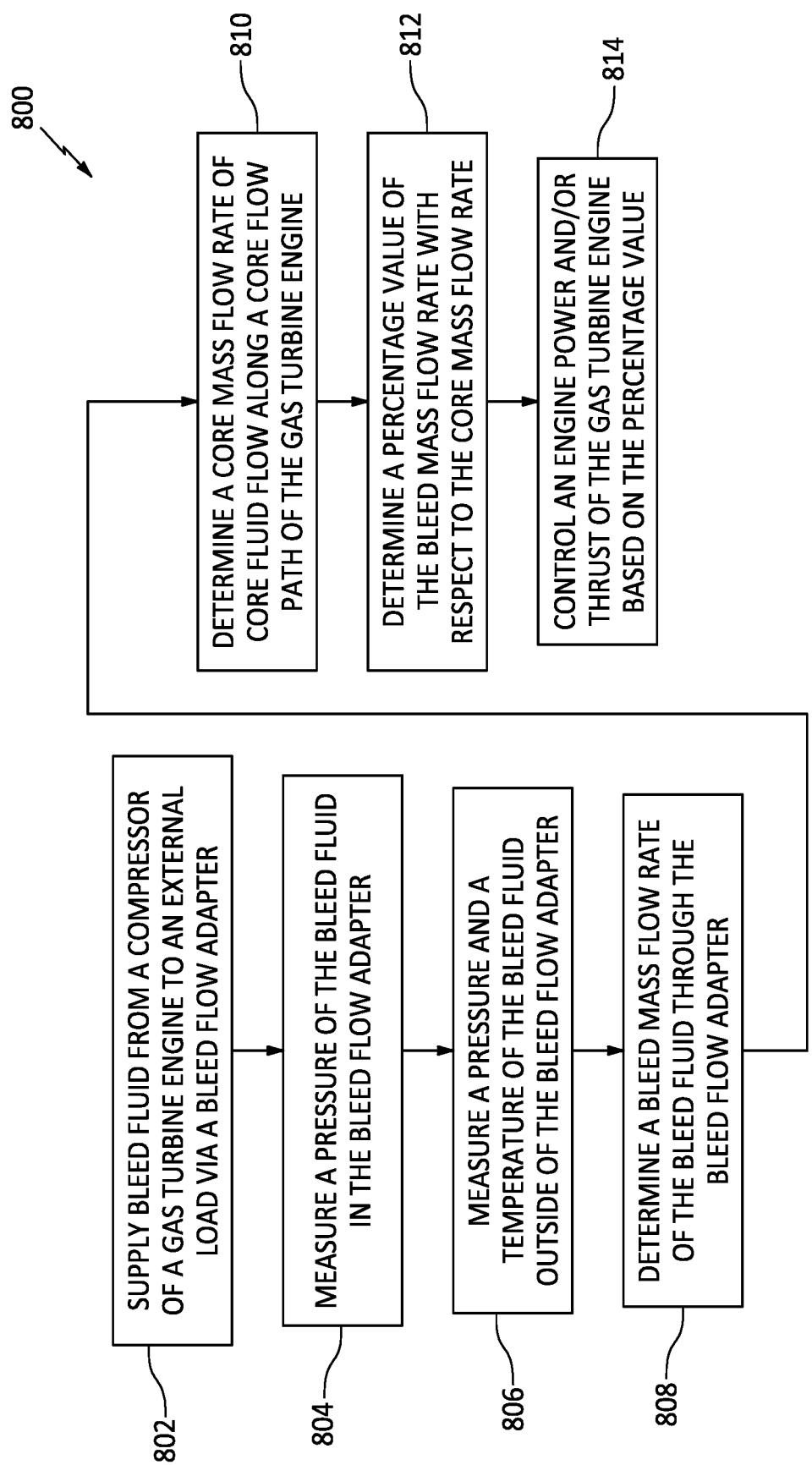
FIG. 8 illustrates a block diagram for a method for determining bleed fluid flow supplied by a gas turbine engine, in accordance with one or more embodiments of the present disclosure.

Referring to FIGS. 1-9, the present disclosure includes a method 800 for determining bleed fluid flow supplied by a gas turbine engine, such as the gas turbine engine 10. FIG. 8 illustrates a flowchart of the method 800. For ease of description, the method 800 is described below with reference to the previously described embodiments of the gas turbine engine 10, bleed flow adapter 56, and bleed flow measurement system 80. The method 800, however, is not limited to use with the bleed flow adapter 56 and bleed flow measurement system 80 and may alternatively be performed with other compressor bleed system configurations. Unless otherwise noted herein, it should be understood that the steps of method 800 are not required to be performed in the specific sequence in which they are discussed below and, in various embodiments, the steps of method 800 may be performed separately or simultaneously.

In Step 802, bleed fluid from a compressor, such as the low-pressure compressor 32 and/or the high-pressure compressor 38, is supplied to the one or more external loads 74 via the bleed flow adapter 56 and the bleed transfer tube 72 selectively mated with the bleed flow adapter 56.

In Step 804, the static pressure of the bleed fluid within the bleed flow adapter 56 is measured by the pressure sensor 84. The pressure sensor 84 provides a pressure signal to the controller 96. In Step 806, the pressure sensor 86 and the temperature sensor 88 are used to measure the pressure and the temperature, respectively, of the bleed fluid. As discussed above, the pressure sensor 86 and the temperature sensor 88 may be configured to directly measure the total pressure and total temperature, respectively, of the bleed fluid or may otherwise measure the static pressure and static temperature of the bleed fluid which may be used by the controller to determine (e.g., approximate) the total pressure and total temperature of the bleed fluid. The pressure sensor 86 and the temperature sensor 88 are positioned to perform bleed fluid measurements of the bleed fluid at a different location than the pressure sensor 84. As previously discussed, the pressure sensor 86 and the temperature sensor 88 may be positioned to measure bleed fluid parameters upstream of the bleed flow adapter 56 (e.g., in the compressor bleed cavity 50) or downstream of the bleed flow adapter 56 (e.g., in the bleed transfer tube 72). The pressure sensor 86 and the temperature sensor 88 provide a pressure signal and a temperature signal, respectively, to the controller 96.

In Step 808, the controller 96 determines a bleed mass flow rate of the bleed fluid flowing through the bleed flow adapter 56 to the external loads 74 along the bleed fluid flow path 82. The bleed mass flow rate is determined using the respective pressure and temperature signals from the pressure sensor 84, the pressure sensor 86, and the temperature sensor 88 along with the predetermined discharge coefficient ($C_d$), as previously described. The controller 96 may output the determined bleed mass flow rate with the output data 100. Measurement of the bleed mass flow rate through the bleed flow adapter 56 in real time allows the gas turbine engine 10 to be operated without the use of conservative operational margins which may be used when the quantity of bleed fluid used by external loads (e.g., the external loads 74) is unknown. Accordingly, the performance and operational capabilities of the gas turbine engine 10 may be improved relative to at least some other known gas turbine engine configurations in which predetermined assumptions of bleed fluid flow rates are used to determine operational margins.

In Step 810, the controller 96 may determine or otherwise receive a core mass flow rate of the core fluid flow along the core flow path 21 of the gas turbine engine 10 (see FIG. 1). The core mass flow rate may be determined, for example, using directly measured values of the core fluid, using synthesized values (e.g., derived from one or more indirect measurements of gas turbine engine parameters), or may use predetermined core mass flow rate values approximated based on analytical gas turbine engine models (e.g., core mass flow rate vs. engine power or compressor rotational speed) and stored in memory 98. The present disclosure is not limited to any particular process for determining the core mass flow rate. In Step 812, the controller 96 may determine a percentage value of the bleed mass flow rate with respect to the core mass flow rate. In other words, the controller 96 may determine a ratio of the bleed mass flow rate to the core mass flow rate. The controller 96 may output the determined core mass flow rate and/or the percentage value with the output data 100.

Figure 9:
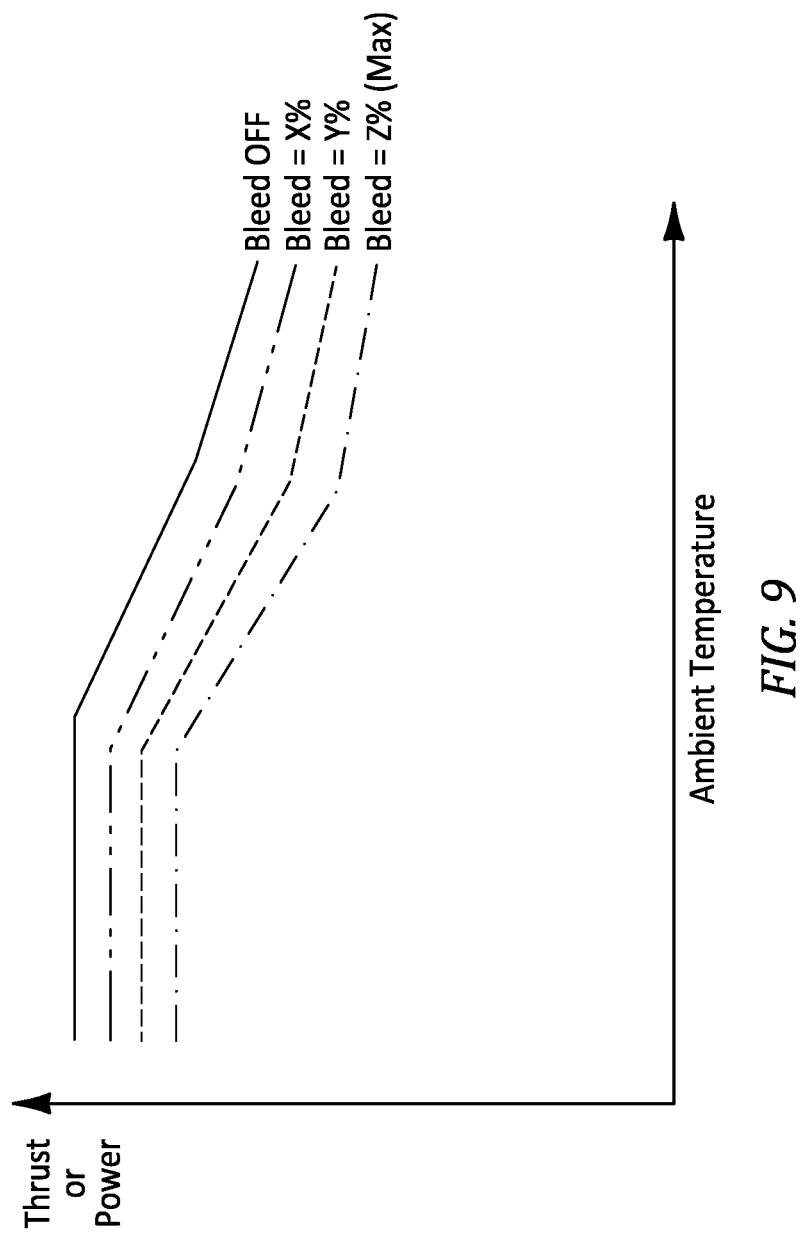
FIG. 9 illustrates a graph of thrust or power vs. ambient temperature for a gas turbine engine providing varying amounts of bleed fluid to external loads, in accordance with one or more embodiments of the present disclosure.

In Step 814, one or more aspects of the operation of the gas turbine engine 10 may be controlled using the percentage value of the bleed mass flow rate to the core mass flow rate. For example, the engine power and/or thrust of the gas turbine engine 10 may be increased or decreased in response to measured changes in the bleed mass flow rate (e.g., as a percentage value of the core mass flow rate). Accordingly, the gas turbine engine 10 may operate at a lower power level when the bleed mass flow rate is relatively low, thereby improving efficiency. As shown in FIG. 9, in some embodiments, the gas turbine engine 10 may be operated at a power and/or thrust setting (e.g., a maximum power and/or thrust setting, a cruising power and/or thrust setting, etc.) which corresponds to the measured bleed mass flow rate as a percentage of the core mass flow rate. FIG. 9 illustrates exemplary power and/or thrust settings for a gas turbine engine based on various measured bleed mass flow rates as a percentage of the core mass flow rate including, no bleed flow (i.e., "Bleed OFF"), X-percent bleed flow, Y-percent bleed flow, and Z-percent bleed flow, where Z>Y>X and where Z is a maximum bleed mass flow rate as a percentage of the core mass flow rate. It should be understood that the thrust and/or power settings for a gas turbine engine, such as the gas turbine engine 10, may be affected by other conditions such as, but not limited to, altitude, Mach number of the bleed fluid within the compressor bleed cavity 50, etc. The fuel flow rate of fuel provided to the combustor 42 may be adjusted to match the desired power and/or thrust setting for a given bleed mass flow rate. For example, the fuel injection system 45 may control the rate of fuel flow provided to the combustor 42 via the fuel nozzles 47.

Using real-time percentage values indicative of the relationship between the bleed fluid flow rate and the core fluid flow rate, the performance and operational capabilities of the gas turbine engine 10 can be optimized. As previously described, the engine power of the gas turbine engine 10 may be controlled to account for a relatively greater or lesser bleed mass flow rate. Using the output data 100 from the controller 96, various parameters or operational limits of the gas turbine engine 10 such as the Indicated Turbine Temperature (ITT) or compressor surge margin may be more accurately measured or otherwise determined, avoiding the need for using conservative assumptions for limiting parameters and providing greater engine power availability for the gas turbine engine 10.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A gas turbine engine comprising:
   a compressor which is rotatable about a longitudinal centerline of the gas turbine engine, the compressor configured to drive a core fluid flow along a core flow path of the gas turbine engine;
   an annular casing surrounding the compressor, the annular casing including an exterior side and an interior side, the interior side surrounding a compressor bleed cavity located downstream of at least a portion of the compressor;
   a bleed flow adapter mounted on the exterior side of the annular casing, the bleed flow adapter in fluid communication with the bleed cavity, the bleed flow adapter including an inlet end, an outlet end, and an inner diameter surface extending between the inlet end and the outlet end, the inner diameter surface defining a bleed passage extending from the inlet end to the outlet end, the bleed flow adapter further including a fluid port formed through the inner diameter surface; and
   a bleed flow measurement system including a first pressure sensor in fluid communication with the bleed passage of the bleed flow adapter via the fluid port.

2. The gas turbine engine of claim 1, wherein the bleed flow measurement system further includes a second pressure sensor and a temperature sensor.

3. The gas turbine engine of claim 2, wherein the second pressure sensor and the temperature sensor are mounted to the annular casing, the second pressure sensor and the temperature sensor in fluid communication with the compressor bleed cavity.

4. The gas turbine engine of claim 3, wherein the bleed flow adapter is mounted to the annular casing at a first circumferential location and the second pressure sensor and the temperature sensor are mounted to the annular casing at a second circumferential location which is different than the first circumferential location.

5. The gas turbine engine of claim 4, wherein the second circumferential location is circumferentially spaced from the first circumferential location by at least ninety degrees with respect to the longitudinal centerline.

6. The gas turbine engine of claim 2, wherein the second pressure sensor and the temperature sensor are positioned downstream of the outlet end of the bleed flow adapter.

7. The gas turbine engine of claim 2, wherein the bleed flow measurement system further includes a controller in signal communication with the first pressure sensor, the second pressure sensor, and the temperature sensor, the controller configured to determine a bleed mass flow rate of bleed fluid flowing through the bleed flow adapter based on a first pressure signal from the first pressure sensor, a second pressure signal from the second pressure sensor, and a temperature signal from the temperature sensor.

8. The gas turbine engine of claim 7, wherein the controller is configured to determine a percentage value of the bleed mass flow rate with respect to a core mass flow rate of the core fluid flow along a core flow path of the gas turbine engine.

9. The gas turbine engine of claim 8, further comprising a combustor configured to receive the core fluid flow from the compressor along the core flow path, wherein the controller is configured to control a fuel flow rate to the combustor based on the bleed mass flow rate as the percentage value.

10. The gas turbine engine of claim 1, wherein the bleed flow adapter includes a seal seat formed in the inner diameter surface downstream of the fluid port.

11. A gas turbine engine comprising:
    a compressor which is rotatable about a longitudinal centerline of the gas turbine engine, the compressor configured to drive a core fluid flow along a core flow path of the gas turbine engine;
    an annular casing surrounding the compressor, the annular casing including an exterior side and an interior side, the interior side surrounding a compressor bleed cavity located downstream of at least a portion of the compressor;
    a bleed flow adapter mounted to the exterior side of the annular casing, the bleed flow adapter in fluid communication with the bleed cavity, the bleed flow adapter including an inlet end, an outlet end, and an inner diameter surface extending between the inlet end and the outlet end, the inner diameter surface defining a bleed passage extending from the inlet end to the outlet end, the bleed flow adapter further including a fluid port formed through the inner diameter surface; and
    a bleed flow measurement system including:
      a first pressure sensor in fluid communication with the bleed passage of the bleed flow adapter via the fluid port;
      a second pressure sensor mounted to the annular casing, the second pressure sensor in fluid communication with the compressor bleed cavity;

a temperature sensor mounted to the annular casing adjacent the second pressure sensor, the temperature sensor in fluid communication with the compressor bleed cavity; and a controller in signal communication with the first pressure sensor, the second pressure sensor, and the temperature sensor, the controller configured to determine a bleed mass flow rate of bleed fluid flowing through the bleed flow adapter based on a first pressure signal from the first pressure sensor, a second pressure signal from the second pressure sensor, and a temperature signal from the temperature sensor.

12. The gas turbine engine of claim 11, further comprising a combustor configured to receive the core fluid flow from the compressor along the core flow path, wherein the controller is configured to:

determine a percentage value of the bleed mass flow rate with respect to a core mass flow rate of the core fluid flow along the core flow path of the gas turbine engine, and control a fuel flow rate to the combustor based on the bleed mass flow rate as the percentage value.

13. A method for determining bleed fluid flow supplied by a gas turbine engine, the method comprising:

supplying bleed fluid from a compressor to an external load via a bleed flow adapter mounted on annular casing surrounding the compressor;

the bleed flow adapter including an inlet end, an outlet end, and an inner diameter surface extending between the inlet end and the outlet end, the inner diameter surface defining a bleed passage extending from the inlet end to the outlet end, the bleed flow adapter further including a fluid port formed through the inner diameter surface;

measuring a first pressure of the bleed fluid within the bleed flow adapter via the fluid port; and determining a bleed mass flow rate of the bleed fluid through the bleed flow adapter using the measured pressure.

14. The method of claim 13, further comprising measuring a second pressure and a temperature of the bleed fluid.

15. The method of claim 14, wherein the second pressure is a static pressure and the temperature is a static temperature, the method further comprising approximating a total pressure using the static pressure and approximating a total temperature using the static temperature.

16. The method of claim 14, wherein the step of determining the bleed mass flow rate includes determining the bleed mass flow rate of the bleed fluid through the bleed flow adapter using the measured temperature.

17. The method of claim 16, wherein the step of measuring the temperature of the bleed fluid includes measuring the temperature of the bleed fluid before the bleed fluid enters the bleed flow adapter.

18. The method of claim 16, wherein the step of measuring the temperature of the bleed fluid includes measuring the temperature of the bleed fluid after the bleed fluid enters the bleed flow adapter.

19. The method of claim 16, further comprising:

determining a core mass flow rate of a core fluid flow along a core flow path of the gas turbine engine; and determining a percentage value of the bleed mass flow rate with respect to the core mass flow rate of the core fluid flow.

20. The method of claim 19, further comprising varying a fuel flow rate to a combustor of the gas turbine engine to operate the gas turbine engine with one or both of a predetermined engine power or a predetermined thrust as a function of the percentage value.

* * * * *